(12) United States Patent  (10) Patent No.: US 7,901,309 B2
Lehtovaara et al.  (45) Date of Patent: Mar. 8, 2011

(54) TENSIONER FOR A TIMING CHAIN

(75) Inventors: Jorma J. Lehtovaara, Mississauga (CA); Marek Frankowski, Innisfil (CA)

(73) Assignee: Litens Automotive Partnership, Woodbridge (CA)

( * ) Notice: Subject to any disclaimer, the term of this patent is extended or adjusted under 35 U.S.C. 154(b) by 435 days.

(21) Appl. No.: 11/661,816

(22) PCT Filed: Sep. 1, 2005

(86) PCT No.: PCT/CA2005/001336
§ 371 (c)(1),
(2), (4) Date: Mar. 1, 2007

(87) PCT Pub. No.: WO2006/024170
PCT Pub. Date: Mar. 9, 2006

(65) Prior Publication Data
US 2007/0259744 A1   Nov. 8, 2007

(51) Int. Cl.
*F16H 7/08* (2006.01)
(52) U.S. Cl. .......................... 474/111; 474/109; 474/135
(58) Field of Classification Search .................. 474/109, 474/111, 117, 138, 140, 133–135
See application file for complete search history.

(56) References Cited

U.S. PATENT DOCUMENTS

| | | | |
|---|---|---|---|
| 1,326,939 A * | 1/1920 | Knudsen | 285/269 |
| 2,269,672 A * | 1/1942 | Klaucke | 474/135 |
| 2,660,281 A * | 11/1953 | Ochtman | 192/141 |
| 2,663,195 A * | 12/1953 | Horan | 474/135 |
| 3,442,147 A | 5/1969 | Downey | |
| 3,455,178 A * | 7/1969 | Ruoff et al. | 474/110 |
| 4,473,362 A * | 9/1984 | Thomey et al. | 474/135 |
| 4,583,962 A * | 4/1986 | Bytzek et al. | 474/133 |
| 4,723,934 A * | 2/1988 | Thomey | 474/135 |
| 4,813,915 A * | 3/1989 | Kotzab | 474/133 |

(Continued)

FOREIGN PATENT DOCUMENTS

CA    2 440 332 A1   9/2002

(Continued)

OTHER PUBLICATIONS

Young, Hugh D., Roger A. Freedman. "10.1 Torque". Sears and Zemansky's University Physics. San Francisco, Calif.: Pearson/Addison Wesley, 2004. 362-363.*

(Continued)

*Primary Examiner* — David D Le
*Assistant Examiner* — Terry Chau
(74) *Attorney, Agent, or Firm* — Harness, Dickey & Pierce, P.L.C.

(57) ABSTRACT

A tensioner has a base plate and a pivot arm. A first end of the pivot arm is pivotally mounted to the base plate for rotation about a first axis. A spring biases the pivot arm to rotate in a tensioning direction. A push rod assembly is pivotally mounted to the second end of the pivot arm. The push rod assembly is rotatable about a second axis extending parallel to the first axis. The push rod assembly frictionally engages the pivot arm generating frictional forces counter acting and damping the spring bias. When the tensioning guide is forced to rotate in the tensioning direction, the acting moment arm of the push rod force causing the guide to rotate towards the endless drive, is considerable longer at the end of the tensioning stroke than in the beginning of the stroke.

8 Claims, 6 Drawing Sheets

U.S. PATENT DOCUMENTS

| | | | |
|---|---|---|---|
| 4,883,446 A * | 11/1989 | Mitchell et al. | 474/133 |
| 4,917,654 A * | 4/1990 | Edwards | 474/133 |
| RE34,543 E | 2/1994 | Komorowski | |
| 5,358,452 A * | 10/1994 | Zhao | 474/133 |
| 6,213,073 B1 | 4/2001 | Iwata | |
| 6,244,981 B1 | 6/2001 | Simpson | |
| 6,332,441 B1 | 12/2001 | Sugiyama et al. | |
| 6,352,487 B1 | 3/2002 | Tada | |
| 6,382,103 B1 | 5/2002 | Rauh | |
| 2002/0006841 A1 * | 1/2002 | Simpson et al. | 474/110 |
| 2002/0160868 A1 * | 10/2002 | Wigsten et al. | 474/101 |
| 2006/0035740 A1 | 2/2006 | Lehtovaara et al. | |

FOREIGN PATENT DOCUMENTS

| | | |
|---|---|---|
| CA | 2 465 338 A1 | 5/2003 |
| DE | 4243451 A1 * | 6/1994 |

OTHER PUBLICATIONS

International Search Report & Written Opinion for PCT/CA2005/001336 Dated Jan. 6, 2006.

* cited by examiner

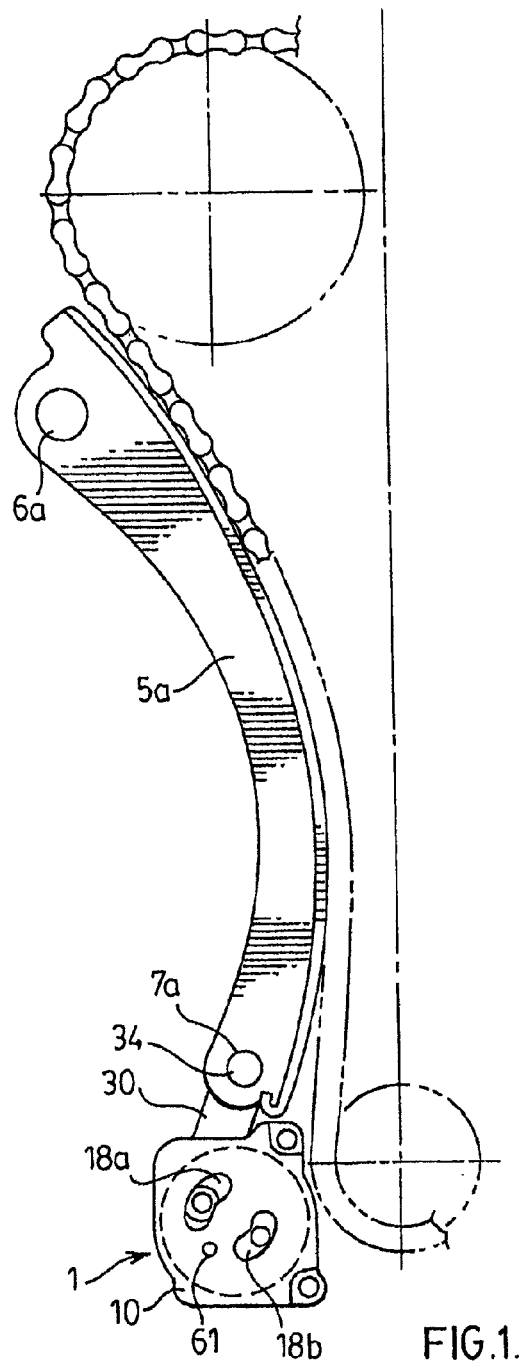
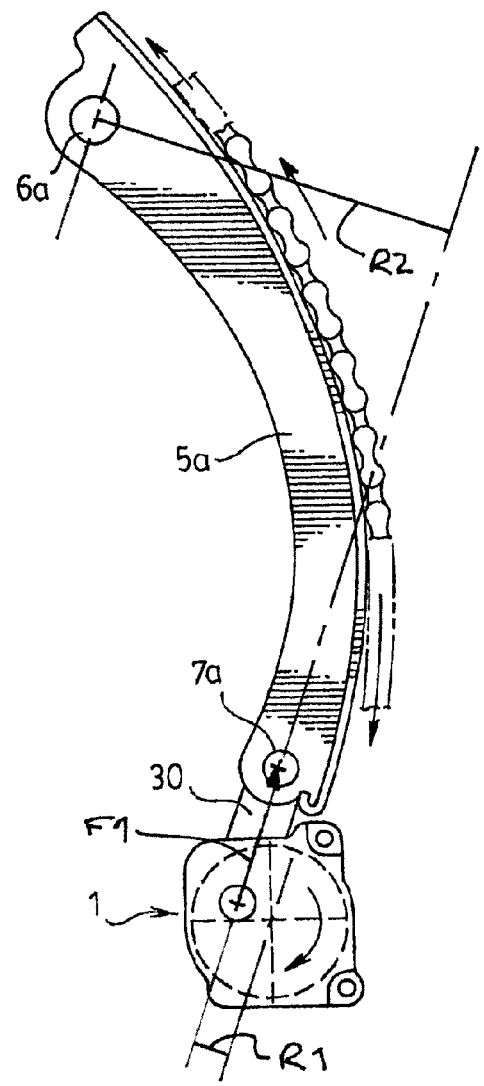
FIG.1.
FIG.2.

TENSIONER FOR A TIMING CHAIN

FIELD OF THE INVENTION

The present invention relates to a tensioner for a timing chain of an engine. In particular, this invention relates to a mechanical tensioner for a timing chain system.

BACKGROUND OF THE INVENTION

On overhead cam engines, the rotation of the cam shafts must be coordinated with the angle of rotation of the crankshaft in order to provide proper timing. A timing belt or a timing chain system is commonly incorporated to provide the requisite timing for the opening and closing of the valves. In both systems, proper tension in the belt or chain is critical to the operation of the engine. Proper tension reduces noise generated by the chain or belt, but more importantly, prevents tooth skip. Tooth skip can cause catastrophic failure of the engine.

For engines having a timing belt, a mechanical tensioner as described in U.S. Pat. Re. 34,543 is widely utilized. The timing belt tensioner maintains proper tension on the timing belt, even during periods of vibration, such as the vibrational experience that occurs during engine start up and shut down, when the engine passes through its resonant frequency.

For engines having a timing chain, a chain tensioning guide and some activation means to bias the guide against the running chain is utilized. The guide normally has a low friction running surface formed into a shape of either a single arc or a combination of multitude of arcs. The position of the chain tensioning guide is continually changing depending on the thermal expansion and retraction of the engine, the stretch and wear of the chain and/or the wear of the sprockets and other chain guides, as well as on the actual acting force of the above-mentioned activation means. The common activation/biasing means normally consists either a blade spring or a hydraulic tensioner consisting of a piston which is being forced towards the tensioning guide by a combination of a compression spring and the pressure of engine oil. The physical nature of these biasing means results in the actual force by which the guide is being pushed towards the chain generally diminishes as the guide is pushed further towards the chain. It is considered that in some engines it would be advantageous to keep the tensioning guide activation force constant or even increase this force when the chain stretches and the tensioning guide moves further towards the chain direction.

The timing chain is normally situated on the end of the engine and covered with a plate. Examples of timing chain tensioners and cover plates include: U.S. Pat. Nos. 6,332,441; 6,382,103; 6,352,487; 6,244,981; and 6,213,073. In the case of hydraulic tensioners, the tensioner receives pressurized oil to maintain a desired pressure on a slack portion of the chain. A relief valve is normally provided to prevent the tensioner from over tensioning the chain. Between the pressure limits, hydraulic tensioners have a tendency to "pump up" without being able to release pressure. Thus, the hydraulic tension is not readily able to release in the event of reverse tension in the chain.

It would thus be desirable to merely substitute a mechanical tension in place of a hydraulic tensioner. However, a chain assembly is normally mounted on the end of the engine and covered with a plate. As a result, there is very limited amount of space available under the cover to install a mechanical tensioner.

In order to provide long enough operational stroke for the tensioner within small space available in the modern car engines, the length of the arm eccentricity must be considerable larger than the diameter of the supporting pivot shaft. This results in the necessity to increase the frictional damping by supplying an additional frictional damping unit at the secondary pivot point between the arm and the push rod. Because of the constant, two directional damping, this tensioner design has a drawback that the damping reduces the effect of the main spring force on the tensioning guide. With the limitation on space, the tensioner is limited in the area of frictional surfaces that generate frictional damping forces that are required for proper operation of the mechanical tensioner.

Thus, it is desirable to provide mechanical tensioner that is sufficiently compact to fit within the volume between the engine block and cover plate and is capable of generating sufficient frictional damping forces for proper operation.

SUMMARY OF THE INVENTION

The principle object of the present invention is to provide a design, which allows a relative constant chain tension over the complete range of the chain take-up.

Another object of the present invention is to provide a frictional damping system which is totally or almost totally affected by the chain forces, thereby allowing the tensioner biasing means to move more freely towards the chain under low chain tension conditions to avoid floating out of tensioner during the heavy vibratory movements of the chain drive.

Still another object of the present invention is to provide a design which is capable to provide enough frictional damping required by the chain drives and simultaneously being compact enough to fit into a small space normally available in car engines.

Yet another object of the present invention is to provide a design which allows the frictional damping being controlled to be either variable or constant over the entire operational range of the tensioner as required by a particular engine, the tensioner is designed for.

Still another object of the present invention is to provide an alternative tensioner design which would allow the use of either frictional or hydraulic damping if so preferred.

The basic, fundamental principle of the present invention is to provide a chain tensioner which includes a push rod, pivotally mounted in both ends, attached in one end to a tensioning guide and activated and positionally arranged in such a way that when the tensioning guide is forced to rotate towards the chain tensioning direction by the tensioner activation means, the acting moment arm of the push rod force causing the guide to rotate towards the chain, is considerable longer at the end of the tensioning stroke than in the beginning of the stroke. The push rod can be either of a fixed length or variable length design.

The push rod is preferable of a fixed length. In this case, it is preferred that the non-guide-end of the push rod is pivotally mounted on a tensioner arm, which is arranged to be rotatable about the pivot centre of the arm. The preferable activation of the chain tensioning is arranged by springs of any known design, ie torsional, compression or extension type, attached between the arm and the stationary part of the tensioner/engine.

Providing a variable length push rod is being used, it is preferred that the non-guide-end of the push rod has a pivot point which has a fixed mounting position on the stationary part of the tensioner/engine and the tensioning of the chain is arranged by extending the push rod either by spring means, hydraulically or by electric activation.

The first embodiment of the present invention comprises a tensioner connected to a tensioning guide. The tensioner consists of an arm, capable of rotating about its centre of pivot by sliding on its outer peripheral surface supported by a base, a fixed length push rod rotatably mounted on the arm and simultaneously connected to a tensioning guide by a pivoting joint, a spring arranged to rotate the arm relative to the base in such a way that the push rod forces the tensioning guide to swivel towards the chain about the centre of the mounting pivot of the guide when the spring rotates the arm, and a front plate which partially encapsulates the push rod inside the base and the arm, simultaneously acting as a thrust plate for the arm and the push rod. The position of the centre of pivot of the arm, the mounting point of the push rod on the arm, the pivoting connection point between the push rod and the tensioning guide as well as the pivot point of the guide are all arranged in such a way that the acting moment arm of the force, induced by the push rod on the tensioning guide, gets increased at least 50 percent when the arm is being rotated by the spring to move the tensioning guide towards the chain direction across the entire chain take-up range of the tensioner/guide assembly.

In the second, preferred embodiment, the arm of the chain tensioner is arranged to have a damping relief cut-out of a certain angular width arranged on its sliding outer peripheral surface in such a position that, due to increased contact forces between the arm and the base, the resulting frictional damping forces reach a certain required level when the push rod force line is parallel to the line going through the pivot centre of the arm and bisecting the damping relief. The angular width of the damping relief is to be selected based on the required increase in the damping level as well as on the overall angular stroke of the arm.

The third embodiment of the present invention comprises an extendible, i.e. variable length push rod, consisting of a guide body, a sliding rod part and a compression spring mounted inside and between the body and the sliding rod part and arranged to force the sliding rod part away from the guide body towards the tensioning guide. The guide body is pivotally mounted to the stationary part of the engine and the sliding rod part is pivotally connected to the tensioning guide. It is also preferred to arrange damping means to the extendible push rod, which will restrict the relative sliding movement between the guide body and the sliding rod part.

The fourth embodiment of the present invention provides a tensioner that has a base plate and a pivot arm. A first end of the pivot arm is pivotally mounted to the base plate for rotation about a first axis. A spring biases the pivot arm to rotate in a tensioning direction. A push rod assembly is pivotally mounted to the second end of the pivot arm. The push rod assembly is rotatable about a second axis extending parallel to the first axis. The push rod assembly frictionally engages the pivot arm generating frictional forces counter acting and damping the spring bias.

BRIEF DESCRIPTION OF THE DRAWINGS

The above-mentioned objects, features and advantages of the present invention will be more fully appreciated from the following detailed description when considered in connection with the accompanying drawings, in which the same or like reference numbers designate the same corresponding parts throughout and in which:

FIG. 1 is a top plan view of tensioning system comprising the fixed length push rod tensioner and the tensioning guide;

FIG. 2 is a top plan view of the tensioning system of FIG. 1, indicating the main forces acting on the system;

DETAILED DESCRIPTION OF THE PREFERRED EMBODIMENTS

Figure 3:
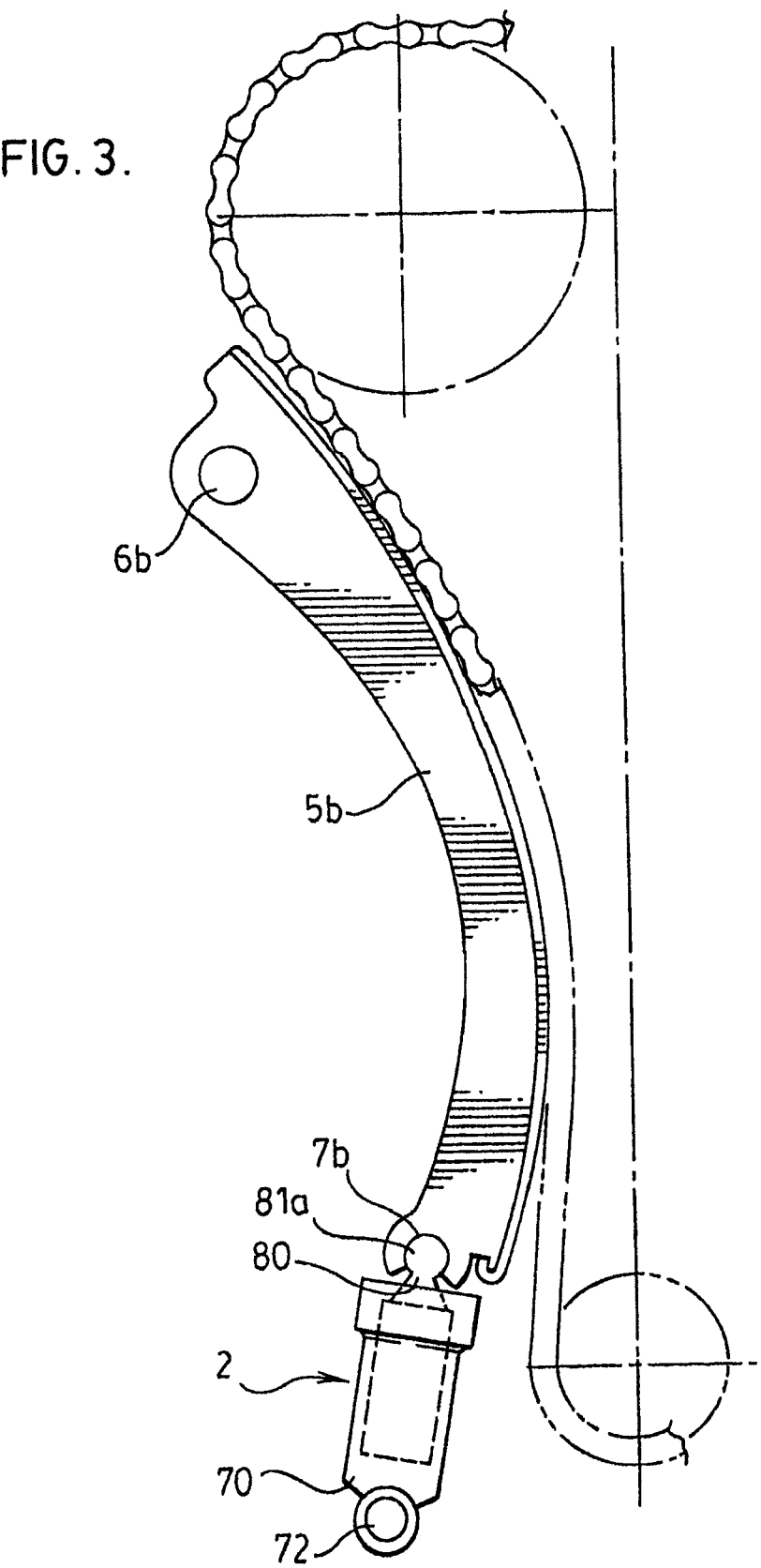
FIG. 3 is a top plan view of tensioning system comprising the variable length push rod tensioner and the tensioning guide.
Figure 7:
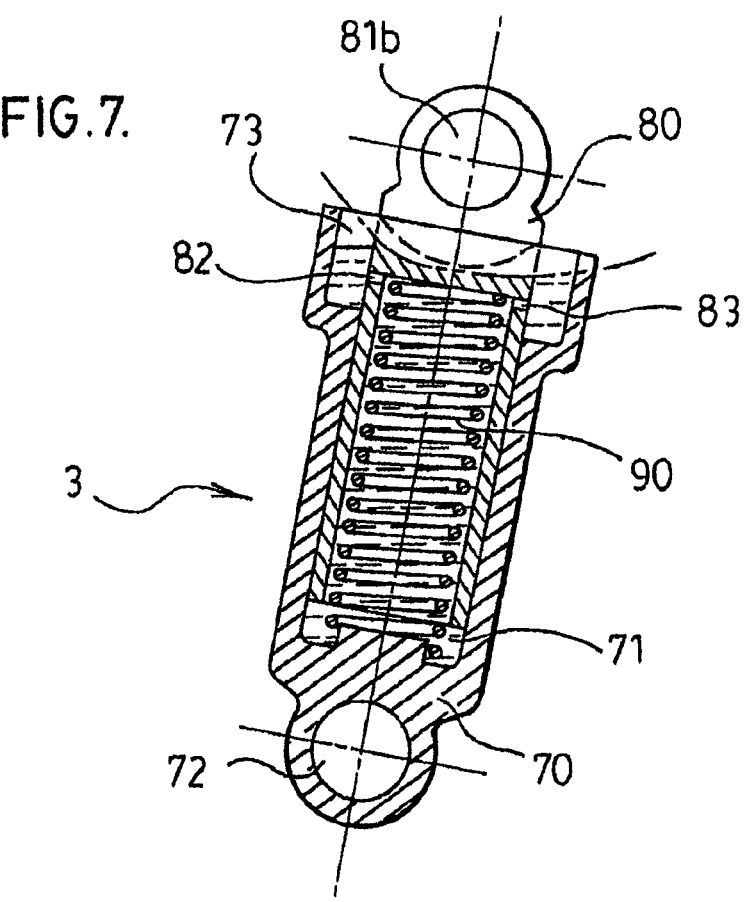
FIG. 7 is a partially cross-sectional top view of the variable length push rod tensioner similar to, but not exactly the same as shown in FIG. 3.
Figure 8:
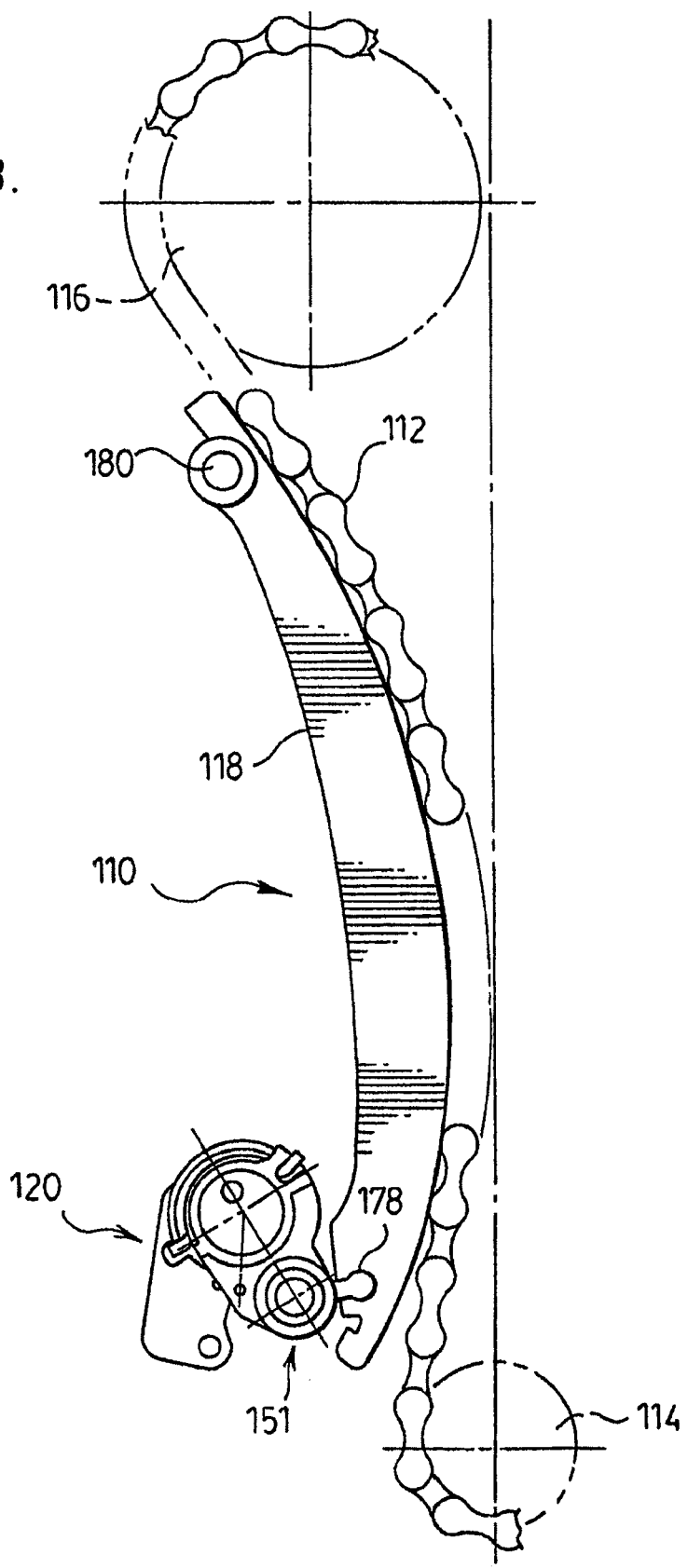
FIG. 8 shows a schematic front elevational view of a tensioner assembly of the fourth embodiment of the present invention with the timing chain assembly shown in broken lines.
Figure 9:
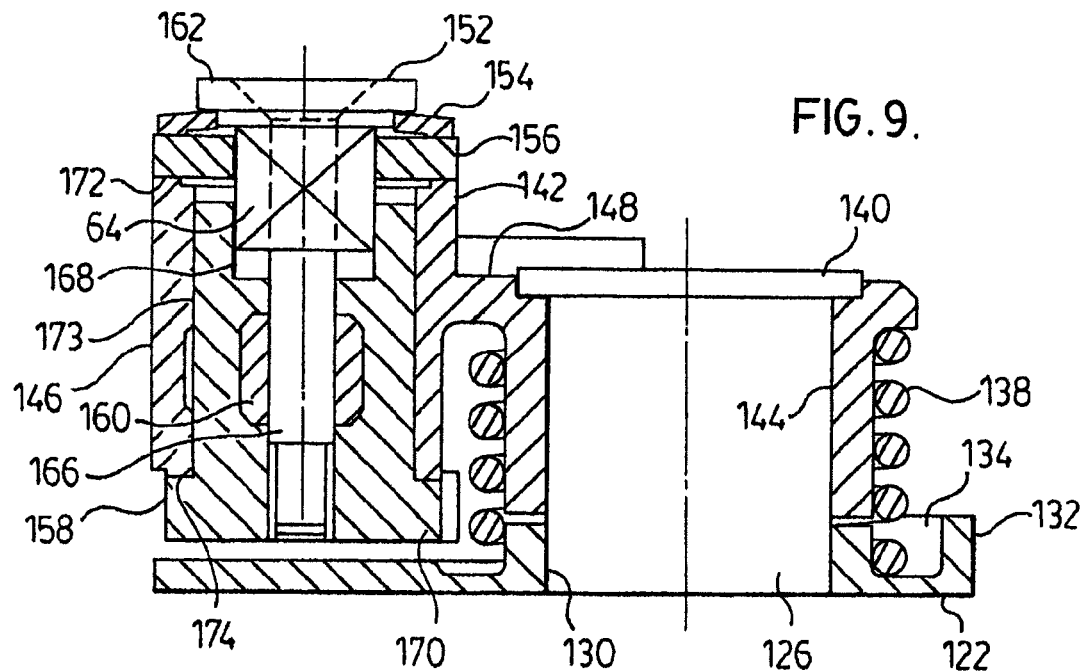
FIG. 9 shows a side sectional view of the tensioner of FIG. 8.
Figure 10:
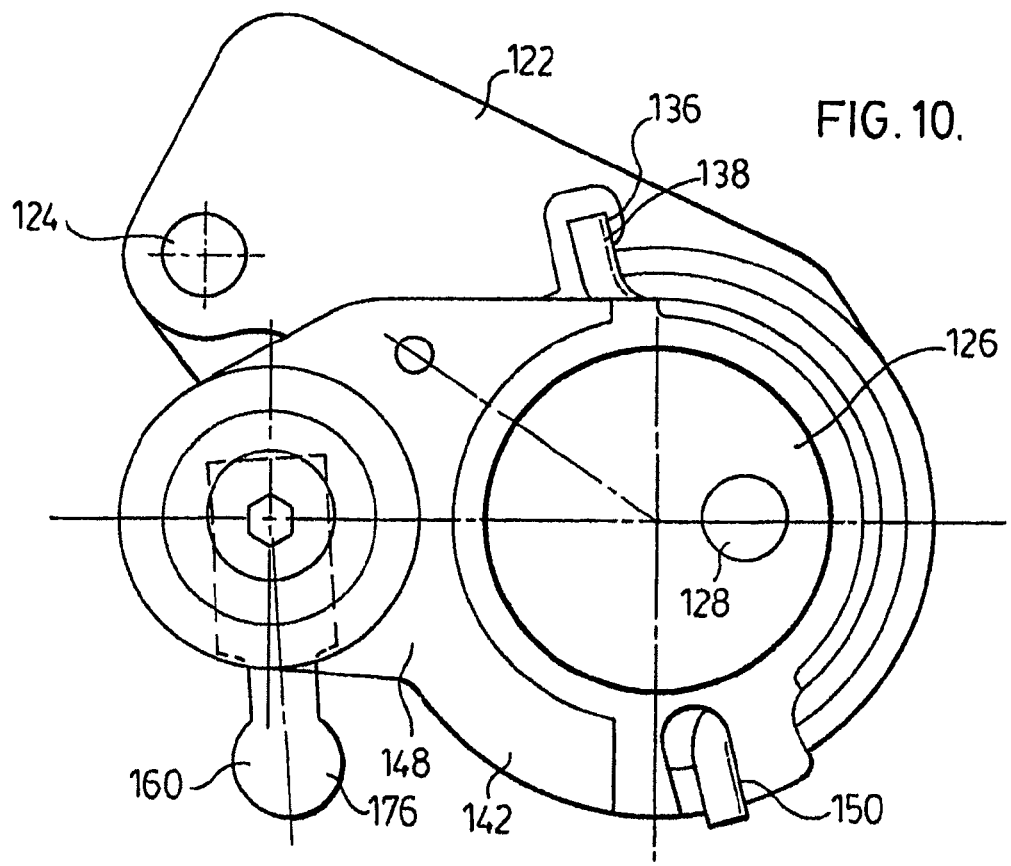
FIG. 10 shows a top plan view of the tensioner of FIG. 9.

A fixed length push rod tensioner in accordance with the present invention is indicated generally at 1 in FIGS. 1, and 2, 110 in FIGS. 8-10, and a variable length push rod tensioners at 2 & 3 in FIGS. 3 and 7.

As shown in FIGS. 1, 4, 5 and 6, the tensioner 1 comprises a base 10, an arm 20, a fixed length push rod 30, a spring 40, and a front plate 50. The arm 20 is installed inside the cylindrical bore 11 of the base 10 and it is thereby able to rotate about the centre line 29 of the arm 20 inside the cylindrical bore 11. The spring 40 is located inside the spring cavity 25 of the arm 20 and it is being preloaded by holding the tangs 41 and 42 against the corresponding tang walls 12 and 26 of the base 10 and the arm 20 and being simultaneously supported by the core walls 13 and 27 of the base 10 and the arm 20.

The push rod 30 has an arm post 31 rotatably inserted into a pivot bore 23 of the arm 20 and it is held axially inside the tensioner 1 by the front plate 50, which is fixed rigidly to the front face 14 of the base 10. The base 10 also has a cut out 15, which allows the push rod centre part 33 to protrude away from the base/arm assembly. For the same purpose, the arm 20 has a front face relief 28 to clear the centre part 33 of the push rod 30.

In order to connect the push rod 30 to a tensioning guide, the push rod 30 also has a guide post 34 at the far end of the centre part 33.

For the mounting of the tensioner 1 to the engine, the base 10 has two mounting bolt through holes 16a and 16b and counterbore type reliefs 17a and 17b to allow the top faces of the mounting bolt heads (mounting bolts are not shown) stay below the top face 15 of the base 10. If so required the front plate or the base can be further equipped with a feature which will help to precisely align the tensioner 1 into a correct position on the engine, such as e.g. the bent tab 51 shown in FIG. 6.

The tensioner also has some special features to help the initial assembly of the tensioner in the production facility, as well as assist during the first installation of the tensioner on the engine and/or during the possible reinstallation in the field service. For this purpose, the arm post 31 of the push rod 30 has a blind hole 32 and the arm 20 has a tooling hole 24 located approximately 180 degree apart on the opposite sides of the centre line 29 of the arm 20. The top face 15 of the base 10 has two arcuate through slots 18a and 18b to allow the insertion of a suitable tool (not shown) into the above mentioned holes 32 and 24 so that the arm 20 can be rotated towards the preinstallation position of the arm. In order to hold the arm 20 in this position against the torque created by the spring 40, the base 10 and the arm 20 have holes 61 and 62 correspondingly in such positions that an installation pin (not shown) can be inserted simultaneously through both holes to lock the arm 20, and thereby also the push rod 30 attached to the arm, into the preinstallation position.

Figure 4:
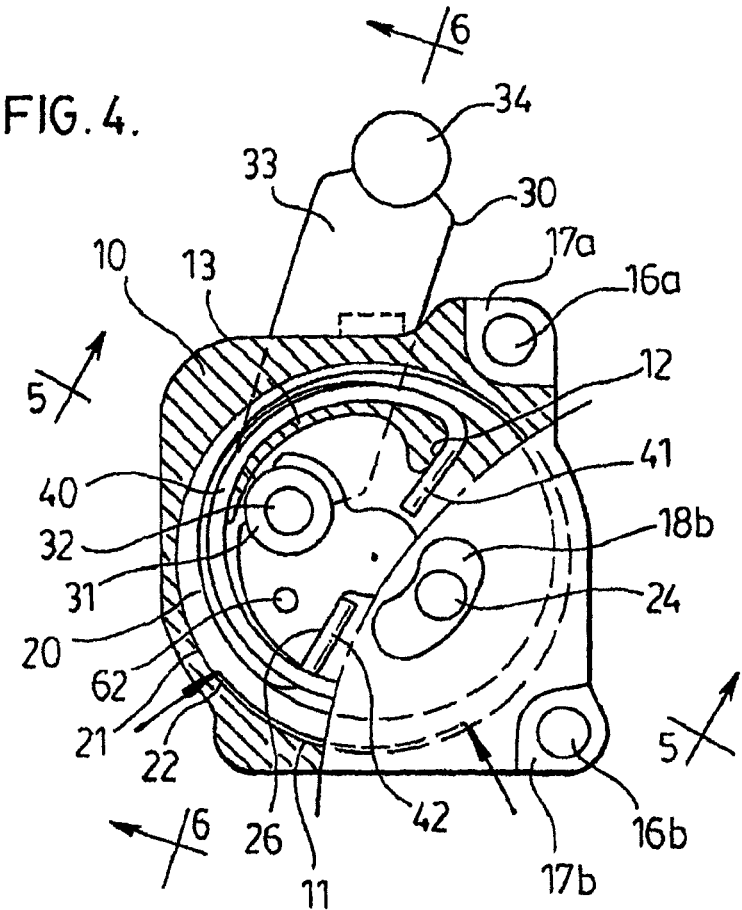
FIG. 4 is a partially cross-sectional top plan view of tensioner shown in FIG. 1.
Figure 5:
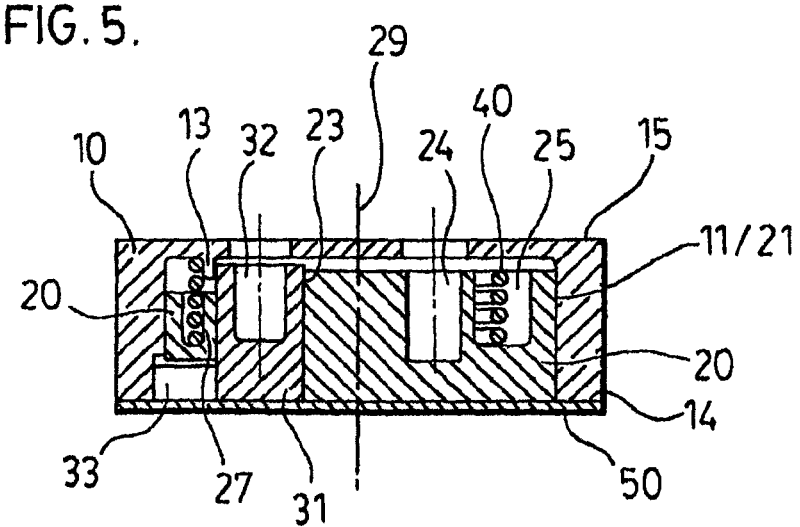
FIG. 5 is a cross-sectional side view taken through the line 5-5 in FIG. 4.
Figure 6:
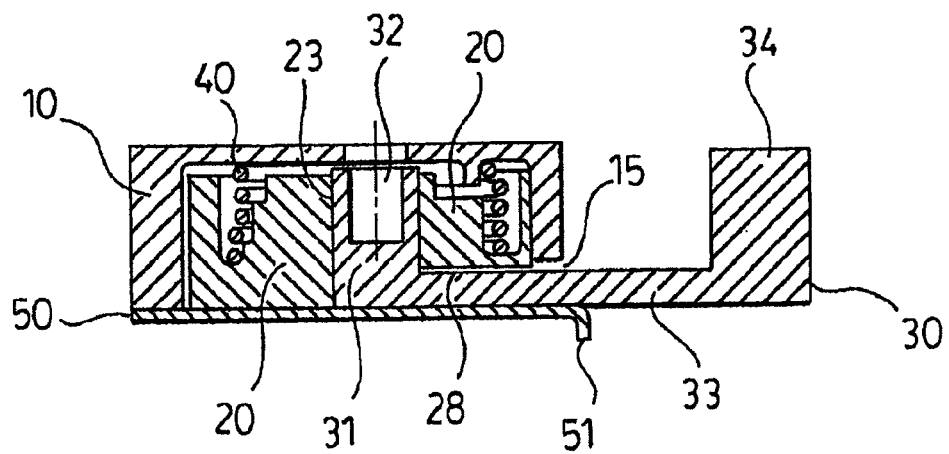
FIG. 6 is a cross-sectional side view taken through the line 6-6 in FIG. 4.

As shown in FIGS. 4 and 5, the arm 20 has also been equipped with a damping relief 22 formed by removing some material along a predetermined angular length and width from the outer periphery 21 of the arm 20. The relief 22 results the support forces between the arm 20 and base 10 to be split into two different locations as shown in FIG. 4 thereby increasing the frictional damping forces acting on the arm 20. This feature will be discussed in more detail in the following paragraphs, which will describe the effect of the system forces on the chain tension.

As will be apparent from FIG. 2, the both pivot points 31 and 34 of the push rod 30 are moving towards the right, when the arm 20 rotates clockwise to swing the tensioning guide 5a towards the chain about its pivot point 6a, in other words towards the chain tensioning direction. Since the pivot 34 moves more to the right than the pivot 31, the push rod action force line does not only get shifted to the right but it also get tilted in clockwise direction, thereby causing the Moment Arm R2 to grow even more while the guide 5a swings towards the chain. The increased length of the Moment Arm R2 will result in increased turning moment acting on the guide 5a hence compensating the fact that the increased wrap angle of the chain increases the counter-acting torque on the guide caused by the chain.

The simultaneously reduced Moment Arm R1 acting between the arm 20 and the push rod 30 further compensates the reduced spring torque when the main spring 40 gets unwound during the clockwise rotation of the arm 20. The combined effect of reduced Moment Arm R1 and increased Moment Arm R2 cooperate to maintain the chain tension relatively constant level—or even increased, if so required by the drive system—regardless of the fact that the spring torque gets reduced and the chain wrap angle gets increased while the tensioner and the tensioning guide move from the installation position into the final, end of the stroke position, which latter represents a totally worn chain drive system in a cold engine.

As is now apparent to those skilled in the art, the position of the axis 29 of the arm 20, the mounting point of the push rod 30 on the arm 20, the pivoting connection point 34 between the push rod 20 and the tensioning guide 5a as well as the pivot point 6a of the guide 5a are all arranged in such a way that the acting moment arm of the force, induced by the push rod 30 on the tensioning guide 5a, gets increased at least 50 percent when the arm 20 is being rotated along its travel by the spring 40 to move the tensioning guide 5a towards the chain direction across the entire chain take-up range of the tensioner/guide assembly.

While the push rod 30 is forcing the tensioning guide 5a towards the chain, the counter-acting force is pushing the push rod towards the arm 20 which is supported by the base 10 along their contact surface. If the peripheral outside surface of the arm 20 is round and solid, the counter-acting force between the arm 20 and the base 10 is approximately the same as the force between the push rod 30 and the arm 20 (Push Rod Force F1 in FIG. 2).

However, if the arm 20 has a damping relief, similar to one shown in FIG. 4 (relief 22), the support force between the arm 20 and the base 10 is split into two forces, each acting perpendicular to the contact surfaces located immediately next to the two ends of the damping relief 22 as indicated in FIG. 2.

Since the arithmetic sum of these two forces is greater than the acting force between the push rod 30 and the arm 20 (Push Rod Force F1), the frictional damping force caused by these two support forces is greater than would be in the case without the damping relief. By changing the angular width of the relief and its angular position, it is possible to vary the maximum effect of the damping groove as well as its occurrence within the stroke range of the arm.

It should be emphasized that the current invention relates to the geometric arrangement of the pivot points of the push rod in relation to the guide to achieve the increased moment arm length of the push rod force acting on the guide at the end of the tensioner stroke and the detail design to achieve this effect is by no means limited to the arrangement shown in FIGS. 1, 4, 5 and 6. For example, the external pivot surface of the arm and the internal pivot hole in the arm for the push rod pivot can be reversed as long as the change in the acting moment arm radius of the push rod forces on the tensioning guide is kept according to the claims. In other words, the arm body can have a small diameter eccentric bore to accommodate a pivot shaft fixed to the engine either directly or through a base structure of the tensioner for the arm to rotate about this pivot shaft, and the large diameter outside periphery of the arm can act as a pivot journal for the push rod. In this case the major frictional damping would occur between the push rod and the arm rather than between the arm and the base.

It should also be recognized that the non-guide-pivot-point (31) of the push rod (20) does not need to follow a circular path but rather this pivot point could be on a slider which follows an elliptical, straight or any other kind of suitable path as long as the rules and specifications regarding the moment arm length of the push rod forces acting on the guide are within the claims. The activation of the sliding movement of the push rod pivot point can be arranged by any known device such as mechanical or pneumatic springs or hydraulic cylinders.

An alternate embodiment consisting of a variable length push rod tensioner 2 or 3 is shown in FIGS. 3 and 7. The similar or near similar components and/or features in these two tensioner systems are indicated with the same reference numerals as above. The push rods 2 and 3 both consists of a stationary guide body 70 and a sliding rod part 80. The sliding rod part 80 is arranged to slide in and out of the bore 71 of the guide body 70. A compression spring 90 is installed inside the sliding rod part 80 between the guide body 70 and the sliding rod part 80 to force the sliding rod part 80 to move out of the guide body 70. The guide body 70 has a hole 72 at the bottom end of the structure which allows the guide body 70 swivel about the centre of the mounting pin/bolt (not shown), which is used to fix the push rod tensioner ⅔ into a correct position in the engine. Similarly, the external end of the sliding rod part 80 has means to connect it in swivelling mode to the tensioning guide (5b). In the push rod tensioner 2 this is a semi-cylindrical rod end 81a, in the push rod tensioner 3, the corresponding feature is an eyelet 81b. It should be emphasized that all push rod designs, whether of a fixed or variable length, shown in this application, will have a swivelling connecting point in both ends and any known knuckle-joint or ball joint type design could be used to achieve the pivoting function.

Providing, the frictional damping occurring on the sliding surfaces between the guide body 70 and the sliding rod part 80 is not sufficient, some additional damping can be added using any known frictional and/or viscous damping means. One of these is shown in detail in FIG. 7. The upper part of the guide body 70 is formed into a shape of large diameter cup 73. This cup 73 can be prefilled with engine oil or the tensioner can be installed into a car engine as empty. The fast flowing engine oil in the chain drive of a running engine will fill the cup 73 immediately after the first start up. Due to the holes 82 and 83 in the centre body of the sliding rod part 80 and the axial pumping action of the tensioning guide/push rod tensioner assembly, the air inside the tensioner 3 will quickly be replaced by the oil which then causes a viscous damping effect on the tensioner movements.

It should also be noted, that—if so preferred—the tensioner 3 could easily be converted into a full hydraulic tensioner by leading a pressurized engine oil passage into the centre cavity 71 of the guide body 70. This could be done in any known method, one of the easiest would be by creating an oil channel from the swivel hole 72 into the centre cavity 71 and using a conventional cross drilled oil lead bolt as the swivel mounting pin installed in the hole 72 of the tensioner 3.

The general construction of the variable length push rod tensioner is not in any way limited to designs described above but it could vary considerably within the claims. E.g. the guide body can be a piston sliding inside the sliding rod part and the sliding motion could between these tensioner components could be along an arcuate path rather than a linear one as shown in FIGS. 3 and 7.

The chain tension compensation using a variable length push rod tensioner works very much in the same way as described with the fixed length push rod tensioner with the reference to FIG. 2. The variable length push rod tensioner does not have the effect of the reduced Moment Arm R1 as described above. However, due to fact that the pivot point 72 does not move to the right as does the pivot point 31 of the fixed length design, the angular tilting of (force) axis of the variable length push rod tensioner (such as 2 or 3) is more than with the fixed length push rod tensioners (such as 1) thereby causing Moment Arm R2 to grow even more to compensate the reduction of the push forces caused by the relaxation of the compression spring (90) forces when the sliding rod part (80) moves outwards away from the guide body (70).

The tensioner assembly 110 of the fourth embodiment of the present invention is generally illustrated in FIG. 8. As shown schematically, a timing chain 112 is trained about a drive sprocket 114 and at least one driven sprocket 116. The tensioner assembly 110 generally comprises a pivoting shoe 118 operatively engaging a tensioner 120.

Referring to FIGS. 8 and 9, a tensioner 120 of the fourth embodiment of the present invention is illustrated in greater detail. The tensioner 120 has a base or mounting plate 122 having a plurality of apertures 124 for affixing the tensioner 120 to the engine. A pivot shaft 126 is mounted on the base plate 122. Pivot shaft 126 preferably has a through bore 128 that enables mounting of the tensioner 120 on the engine. Pivot shaft 126 has a head 140.

Base plate 122 has a circular embossment 130 that receives pivot shaft 126. Base plate 122 has a spring flange 132 that cooperates with embossment 130 to define a spring well 134. The end of the spring well 134 has a notch 136.

A pivot arm 142 is pivotally mounted on pivot shaft 126. Pivot arm 142 generally has two cylindrical sleeves 144 and 146 joined by a web 146. The longitudinal axis of each sleeve 144 and 146 extends parallel to each other. Sleeve 144 is generally of the same longitudinal length as sleeve 146. However, sleeve 146 is positioned to be spaced further from the base plate 122 than sleeve 144. Sleeve 144 has a notch 150.

Spring 138 is a preferably a coil spring. Spring 138 wraps about sleeve 144. Spring 138 has two bent ends to extend between notch 136 on the base plate 122 and notch 150 of the pivot arm 142. Spring 138 biases the pivot arm 142 in a chain tensioning direction.

A damping assembly 151 is pivotally mounted within sleeve 146 of pivot arm 142. The damping assembly generally comprises a bolt 152, a Belleville washer 154, a friction washer 156, a hub 158 and a push rod 160. The bolt 152 has a head 162 and a first shank portion 164 and a second shaft portion 166. The end of the second shaft portion 166 engages with the hub 158. The first shank portion 164 has a non-circular configuration and engages with a complementary non-circular recess 168 in the end of hub 158. Hub 158 has a flange 170 that limits the ingress of the hub within cylinder 146. Push rod 160 is mounted on the second shank portion 166 of bolt 152 and extends through hub 158.

When assembled, the bolt 152 and the hub bushing 158 sandwich the upper and lower ends of sleeve 146 to provide two frictional surfaces 172 and 174 on the opposite ends of the sleeve 146, in addition to the circumferential surface 173. Belleville washer 154 cooperates with the bolt 152 to bias washer 156 to bias the frictional surfaces 172, 174 to a desired degree. As is apparent, bolt 152 is configured to rotate with the washer 156, and hub bushing 158 as the push rod 160 is rotated, thereby ensuring that push rod 160 is rotated in one sense, frictional forces are generated in the opposite sense providing damping to the spring forces.

Push rod assembly 160 has a ball formation 176 on a distal end that extends from the hub bushing 158. The ball formation 176 is inserted into a complementary socket 178 on the chain guide or shoe 118. Shoe 118 is pivotally mounted by pin 180. Shoe 118 is otherwise conventional in design and configuration.

In operation, the bias of spring 138 urges the pivot arm 142 towards the chain 112 to take up slack. As the pivot arm 142 rotates, the relative angle between the shoe 118 and the pivot arm 142 varies causing the push rod assembly 151 to rotate relative to the pivot arm 142 generating frictional forces at frictional surfaces 172, 174, which frictional forces act in an opposite sense to the spring bias thereby providing damping.

The frictional damping forces are generated on the second cylinder 146 and not primarily, as conventionally done in other tensioners, on the pivot shaft 126. In this manner, the length of the pivot shaft 126 can be minimized and the length of the push rod assembly 151 can be maximized. The pivot shaft 126 is normally positioned closer to the perimeter of the cover plate where space is at a minimum. This arrangement enables the tensioner 120 to be designed to fit within the confines between the cover plate end the engine block, allowing the tensioner 120 to be capable of being substituted in place of an existing hydraulic tensioner without re-designing the cover plate of the engine.

The above described embodiments of the invention are intended to be examples of the present invention and numerous modifications, variations, and adaptations may be made to the particular embodiments of the invention without departing from the scope of the invention, which is defined in the claims.

For example, the tensioning guide shown is of a leading type, i.e. the friction between the guide and the running chain is pulling the guide towards the chain. However, the push rod tensioner can as easily be accommodated with a trailing tensioning guide as long the geometric relationship between the pivot points of the push rod and the guide pivot are kept according within the claims.

What is claimed is:

1. A tensioner that is adapted to be coupled to an engine for tensioning an endless power transmitting element, the tensioner comprising:
 a front plate having a bent tab that is configured to locate the tensioner relative to the engine;
 a base defining a bore and a pair of tool slots, the bore being formed along a first axis and having a first abutment surface, the first abutment surface being centered about the first axis and extending in a circumferential direction, the base being coupled to the front plate such that the front plate closes the bore, the tool slots being formed through the base on a side opposite the front plate and intersecting the bore;
 a pivot arm disposed within the bore for rotation relative to the base, the pivot arm having a second abutment surface and a first tooling feature, the second abutment surface abutting the first abutment surface and extending in a circumferential direction;
 a spring biasing the pivot arm about the base in a tensioning direction; and
 a push rod mounted to the pivot arm for pivotal movement about a second axis that is offset from the first axis, the push rod having a second tooling feature;
 wherein the first and second tooling features can be aligned to the tool slots through rotation of the pivot arm relative to the base to permit a tool to be inserted through the tool slots and engaged to the first and second tooling features.

2. The tensioner of claim 1, wherein the first and second tooling features are holes.

3. The tensioner of claim 1, further comprising a tensioning guide that is pivotally coupled to the push rod, whereby as the tensioning guide rotates in the tensioning direction, the moment arm of the forces transmitted by the push rod assembly to rotate the tensioning guide will increase.

4. The tensioner of claim 3, wherein the moment arm is at least 50 percent larger at the end of travel of the tensioning guide compared to the length of the moment arm at the beginning of travel of the tensioning guide.

5. The tensioner of claim 1, wherein the push rod has a fixed length.

6. The tensioner of claim 1, wherein contact between the first and second abutment surfaces generates friction forces that tends to inhibit movement of the pivot arm relative to the base.

7. The tensioner of claim 6, wherein a frictional damping force resulting from the friction forces generated through contact between the first and second abutment surfaces reaches a predetermined maximum when the push rod assembly is inline with the pivot of the pivot arm.

8. The tensioner of claim 6, wherein the pivot arm has a relief along an outer periphery, the relief forming a zone in which contact does not occur between the pivot arm and the base.

\* \* \* \* \*